United States Patent [19]  [11] 4,109,471
Sebald et al.  [45] Aug. 29, 1978

[54] METHOD OF COVERING THE BOTTOM SURFACE IN A GAS CAVERN

[75] Inventors: Franz X. Sebald, Munich; Hans-Dieter Hagemann, Hamburg, both of Germany

[73] Assignee: Deutsche Texaco Aktiengesellschaft, Hamburg, Germany

[21] Appl. No.: 719,890

[22] Filed: Sep. 2, 1976

[30] Foreign Application Priority Data

Sep. 6, 1975 [DE] Fed. Rep. of Germany ....... 2539720

[51] Int. Cl.² .......................... B65G 5/00; B01J 1/18
[52] U.S. Cl. ........................................ 61/0.5; 48/174; 21/60.5 A; 106/273 R
[58] Field of Search .................. 21/60.5 R, 60.5 A; 106/122, 275, 273 R, 280, 281; 166/295; 61/.5; 427/138; 48/174, 190

[56] References Cited

U.S. PATENT DOCUMENTS

| | | | |
|---|---|---|---|
| 1,814,053 | 7/1931 | Mueller | 21/60.5 R X |
| 2,907,627 | 10/1959 | Cummings | 21/60.05 A |
| 2,939,884 | 6/1960 | Garrison | 61/0.5 X |
| 2,939,895 | 6/1960 | Hess et al. | 61/0.5 X |
| 3,095,263 | 6/1963 | Eckert et al. | 21/60.5 R |
| 3,531,239 | 9/1970 | Rowlette | 21/60.5 R |
| 3,949,559 | 4/1976 | Meyer | 61/0.5 |

*Primary Examiner*—Morris O. Wolk
*Assistant Examiner*—Arnold Turk
*Attorney, Agent, or Firm*—Thomas H. Whaley; Carl G. Ries; Charles L. Bauer

[57] ABSTRACT

Method for depositing a layer or carpet of bitumen in an underground cavern which has a water sump layer in the bottom, and which is used for storing gaseous hydrocarbons, whereby the deposited bitumen carpet minimizes the vaporization of the cavern water into the stored gaseous hydrocarbon.

10 Claims, No Drawings

METHOD OF COVERING THE BOTTOM SURFACE IN A GAS CAVERN

BACKGROUND OF THE INVENTION

This invention relates to a method of covering the bottom surface in a gas cavern suitable for storing natural gas or other gaseous fuels. Generally the conditions of temperature and pressure in such caverns are in the range of from 50° to 70° C and from about 20 to 120 atmospheres. Under these conditions, the water in the bottom of the cavern evaporates and mixes with the natural gas or gaseous fuel stored therein. During storage, the natural gas, which is initially in dry form, becomes saturated with water vapor, generally in approximately 5 to 7 months after the natural gas has been introduced into the cavern. Therefore, upon reclaiming or reproducing the gas for reuse it must be passed through a drier in order to separate the water vapor from the gas as completely as possible. This separation is time consuming and costly. Furthermore, the methods may require introducing supplemental methanol in order to avoid the formation of hydrates in the cavern riser tubes that provide means for supply and withdrawal of the storage gas.

It is thus the object of the present invention to provide a method for minimizing or preventing the water in the bottom of a cavern used for storing gaseous hydrocarbons to become mixed with the stored gaseous hydrocarbons, thereby making it possible to recover the stored gaseous hydrocarbon more quickly and economically.

SUMMARY OF THE INVENTION

This invention provides for the deposition of a bitumen layer or carpet in the bottom of an underground cavern and on the water sump layer, which cavern is used for the underground storage of gaseous hydrocarbons. The bitumen can be deposited either as effervesced bitumen or as a thin-bodied layer of pure bitumen, thereby minimizing the vaporization of the cavern water into the stored gaseous hydrocarbons.

DESCRIPTION OF THE PREFERRED EMBODIMENT

The present invention relates to an improved method for storing natural gas or other gaseous fuels in an underground cavern whereby the stored material can be recovered quickly and economically. More particularly, the present invention relates to minimizing or preventing water that exists in the bottom of the cavern from vaporizing or mixing into the stored gaseous hydrocarbons. The object of the invention is achieved by applying bitumen to the bottom surface of the gas cavern thereby providing a separation layer in the gas cavern between the water in the cavern and the gas introduced therein for storage. By the invention, the bitumen may be introduced in effervesced form or as a solution in mineral oil. The introduced bitumen settles on the bottom of the cavern on top of the water sump surface so as to provide a complete cover and separating layer between the water and the area above the water.

In the embodiment utilizing the effervesced form of bitumen, a mixture of bitumen and ground limestone in a carrier, preferably a hydrocarbon such as mineral oil, is introduced into the cavern, while separately and simultaneously an acid, preferably an acid resin, is injected. The mixtures are brought together in the cavern at the water sump layer where the limestone and acid react to generate carbon dioxide thereby creating in situ a foamed bitumen carpet. The mixtures can be injected in liquid form via suitably placed cavern riser means that traverse the cavern to the top of the water layer. In a modification of the mixture, the acid may be an acid anhydride such as a particulate acid as phosphorus pentoxide or a liquid acid such as sulfur trioxide.

In another embodiment the bitumen can be dissolved in a hydrocarbon carrier such as mineral oil, so that the resultant mixture has a low viscosity and is easily pumpable. The mixture is injected via a single cavern riser means to the bottom of the cavern where a thin-bodied bitumen layer is deposited by the volatilization of the mineral oil, resulting in a cover layer composed of essentially pure bitumen.

The bitumen, suitable for use either as a froth or in a solvent, may be a high molecular-weight hydrocarbon mixture, either semisolid or brittle, that may be obtained from treatment of petroleum. For example, a suitable mixture is the carbon disulfide soluble portion of natural asphalts. A preferred bitumen is soft to medium-hard, having a melting point from 27° to 49° C, and is obtained by distillation of petroleum.

The ground limestone preferably is of the type used for fillers in road building having a grain size of at least 80% below the 0.09 millimeter mesh sieve.

The preferred acid resins are those acid resinous residues or byproducts obtained from refining processes of lubricating oils with concentrated sulfuric acid or reclaiming treatments of used oils with sulfuric acid. In addition, acid anhydrides such as particulate phosphorus pentoxide or liquid sulfur trioxide may be used.

The hydrocarbon carrier preferred is a mineral oil cut capable of dissolving bitumen to give a mixture that has suitable low viscosity required for achieving a pumpable bitumen/mineral oil solution. In particular the preferred mineral oils are the atmospheric distillation cuts of petroleum in the range of 180° to 370° C.

In an example of the application of an effervesced mix of a bitumen foam or froth the method was applied to a cavern having a bottom surface area of 400 square meters. The cavern conditions were a pressure of 70 atmospheres, and an average temperature between 50° and 90° C. It was calculated that 13.6 tons of material were required in order to obtain a desired foam thickness of 10 centimeters. The components of the effervesced mix were bitumen having a melting point of from 27° to 37° C, ground limestone ($CaCO_3$) having grain sizes of at least 80% below the 0.09 millimeter mesh sieve, and an acid resin recovered from the acid refining treatment of lubricating oils having 50 to 60% sulfuric acid. The components were admixed shortly before being injected into the cavern. Effervescence occurred of the bitumen in the formation due to the formation of carbonic acid. A bitumen foam carpet was spread at the bottom of the cavern and on the water sump surface. In the example, to cover the 400 sq. m. of bottom surface, 10.8 tons of bitumen, 1.4 tons of ground limestone, and 1.4 tons of acid resin were used, basis the ratio of the solids to pores being 1 to 2, a ground limestone conversion of 50% and a 50% acid resin. Approximately 27 $m^3$ of carbon dioxide were generated.

In an example, of the bitumen/mineral oil layer method, a mixture of 70% by weight of bitumen having a melting point in the range of from 27° to 37° C and 30% by weight of a hydrocarbon oil having a boiling range between 180° and 360° C was used. To cover 400 square meters with a 5 cm thick layer, 7 tons of said mixture were used, namely 4.9 tons bitumen and 2.1 tons of mineral oil cut. The solution was applied via a cavern riser tube means suitably placed in the cavern whereby a thin-bodied bitumen layer was formed on the water sump surface by the vaporization of the mineral oil.

In the application of the effervesced bitumen mixture, the following equation may be used to determine the packing effect of the effervesced bitumen mixture:

$$Q = K[F \cdot t \cdot (p_1 - p_2)/d]$$

where $Q$ = diffused water content, in grams
$K$ = diffusion constant for bitumen ($10^{-8}$)
$F$ = surface area of separating layer, in $cm^2$
$d$ = thickness of separating layer, in cm
$t$ = time, in hours
$p_1 - p_2$ = difference in pressure, in Torr Using this equation the amount of water diffusing through the bitumen layer was calculated as about 20 grams in 6 months, allowing for a value for $p_1 - p_2$ of 1. This value is always, in practice, below 1, so in actuality even less water diffused through the bitumen.

We claim:

1. In the storage of gaseous hydrocarbons in an underground cavern containing a water sump layer in the bottom thereof having a surface in contact with the gaseous hydrocarbons, the improvement comprising:
covering the surface of said water sump layer with a separation layer by the deposition thereon of a vapor barrier consisting essentially of a carpet of bitumen to prevent the vaporizing of said water into said gaseous hydrocarbons by the injection into said cavern of a mixture of bitumen and a volatile liquid hydrocarbon carrier wherein said carpet of bitumen is formed by the vaporization of said volatile liquid hydrocarbon in said cavern.

2. The method of claim 1 wherein said bitumen is a high molecular weight hydrocarbon obtained from the treatment of petroleum having a melting point from 27° to 49° C.

3. The method of claim 1 wherein said bitumen is obtained from the carbon disulfide soluble portion of natural asphalts.

4. The method of claim 1 wherein said hydrocarbon carrier is a mineral oil.

5. The method of claim 1 wherein said mixture of bitumen and volatile liquid hydrocarbon carrier contains ground limestone and a second mixture comprising an acid is injected whereby upon contact of said acid and said limestone, carbon dioxide is generated to create said carpet of bitumen in effervesced form.

6. The method of claim 5 wherein said ground limestone has a particle grain size of at least 80% below the 0.09 millimeter mesh sieve.

7. The method of claim 5 wherein said acid is an acid resin obtained from petroleum refining.

8. The method of claim 5 wherein said acid is an acid anhydride.

9. The method of claim 8 wherein said acid anhydride is sulfur trioxide.

10. The method of claim 8 wherein said acid anhydride is phosphorus pentoxide.

* * * * *